(12) United States Patent
Salter et al.

(10) Patent No.: US 9,855,797 B1
(45) Date of Patent: Jan. 2, 2018

(54) ILLUMINATED SYSTEM FOR A VEHICLE

(71) Applicant: Ford Global Technologies, LLC, Dearborn, MI (US)

(72) Inventors: Stuart C. Salter, White Lake, MI (US); Pietro Buttolo, Dearborn Heights, MI (US); Paul Kenneth Dellock, Northville, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 15/208,741

(22) Filed: Jul. 13, 2016

(51) Int. Cl.
| B60Q 1/00 | (2006.01) |
| B60Q 1/26 | (2006.01) |
| B60C 3/06 | (2006.01) |
| B60R 13/00 | (2006.01) |
| B62D 25/12 | (2006.01) |

(52) U.S. Cl.
CPC .............. B60C 3/06 (2013.01); B60Q 1/2669 (2013.01); B60R 13/005 (2013.01); B62D 25/12 (2013.01)

(58) Field of Classification Search
CPC ....... B60C 1/26; B60C 1/2619; B60C 1/2661; B60C 1/2669; B60C 1/2692; B60C 1/2696; B60C 3/30; B60C 3/57; B60C 3/68; B60R 13/005; B62D 25/12
USPC ................................. 362/487, 496, 510–512
See application file for complete search history.

(56) References Cited

U.S. PATENT DOCUMENTS

| 2,486,859 | A | 11/1949 | Meijer et al. |
| 5,053,930 | A | 10/1991 | Benavides |
| 5,193,893 | A | 3/1993 | Mitko |
| 5,709,453 | A | 1/1998 | Krent et al. |
| 5,839,718 | A | 11/1998 | Hase et al. |
| 6,031,511 | A | 2/2000 | DeLuca et al. |
| 6,117,362 | A | 9/2000 | Yen et al. |
| 6,419,854 | B1 | 7/2002 | Yocom et al. |
| 6,494,490 | B1 | 12/2002 | Trantoul |
| 6,577,073 | B2 | 6/2003 | Shimizu et al. |
| 6,729,738 | B2 | 5/2004 | Fuwausa et al. |
| 6,737,964 | B2 | 5/2004 | Samman et al. |
| 6,773,129 | B2 | 8/2004 | Anderson, Jr. et al. |
| 6,820,888 | B1 | 11/2004 | Griffin |
| 6,851,840 | B2 | 2/2005 | Ramamurthy et al. |
| 6,859,148 | B2 | 2/2005 | Miller |
| 6,871,986 | B2 | 3/2005 | Yamanaka et al. |

(Continued)

FOREIGN PATENT DOCUMENTS

| CN | 101337492 A | 1/2009 |
| CN | 201169230 Y | 2/2009 |

(Continued)

*Primary Examiner* — Jason Moon Han
(74) *Attorney, Agent, or Firm* — Jason Rogers; Price Heneveld LLP

(57) ABSTRACT

An illuminated system is provided herein. The illuminated system includes a badge that is movable between a first position and a second position. First and second light sources are disposed within the badge. The first light source is configured to direct light in a first direction. The second light source is configured to direct light in a second direction. A vehicle feature is operably coupled with the second light source. A first photoluminescent structure is disposed on the vehicle feature and is configured to luminesce in response to receiving an excitation light from the light source. A controller is configured to selectively activate the first and second light sources.

20 Claims, 15 Drawing Sheets

(56) References Cited

U.S. PATENT DOCUMENTS

| | | |
|---|---|---|
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0092965 A1 | 4/2013 | Kijima et al. |
| 2013/0155709 A1 | 6/2013 | Kim et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0138795 A1 | 5/2015 | Salter et al. |
| 2015/0267881 A1 | 9/2015 | Salter et al. |
| 2016/0016506 A1 | 1/2016 | Collins et al. |
| 2016/0102819 A1 | 4/2016 | Misawa et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| DE | 102012009293 A1 | 11/2013 |
| DE | 102015109390 A1 | 1/2016 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2005018987 A1 | 3/2005 |
| WO | 2006047306 A1 | 5/2006 |
| WO | 2014068440 A1 | 5/2014 |
| WO | 2014161927 A1 | 10/2014 |

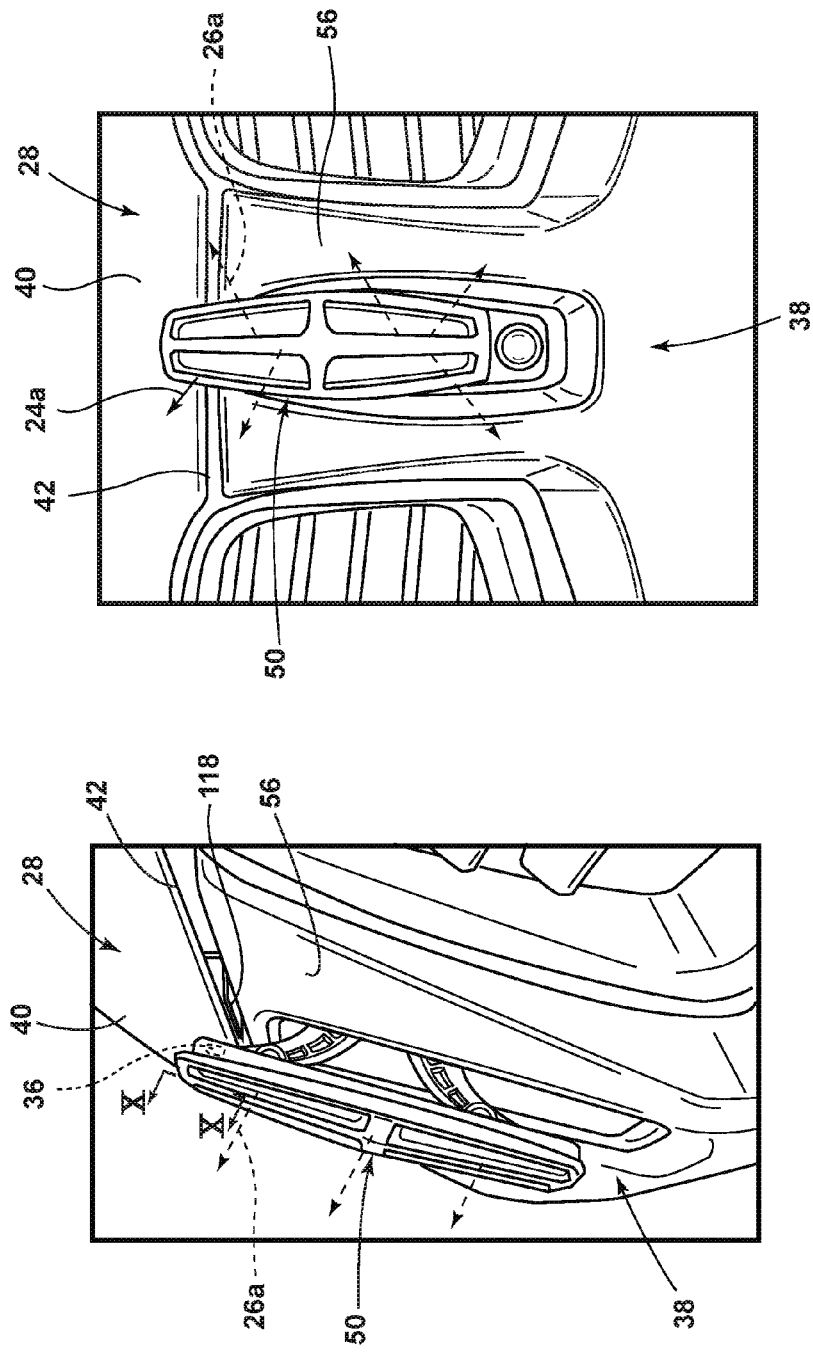

ILLUMINATED SYSTEM FOR A VEHICLE

FIELD OF THE INVENTION

The present disclosure generally relates to vehicle lamp assemblies, and more particularly, to vehicle lamp assemblies employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, an illuminated system for a vehicle is disclosed. The illuminated system includes a badge movable between a first position and a second position. First and second light sources are disposed within the badge. The first light source is configured to direct light in a first direction. The second light source is configured to direct light in a second direction. A vehicle feature is operably coupled with the second light source. A first photoluminescent structure is disposed on the vehicle feature and configured to luminesce in response to receiving an excitation light from the light source. A controller is configured to selectively activate the first and second light sources.

According to another aspect of the present invention, an illuminated system for a vehicle is disclosed. The illuminated system includes a badge disposed on a vehicle. The badge is movable between a first position and a second position. A light source is disposed in the badge. The first light source is concealed in the first position and is configured to emit excitation light rearwardly in the second position towards a vehicle feature.

According to yet another aspect of the present invention, an illuminated system for a vehicle is disclosed. The illuminated system includes a movable member disposed on a vehicle. The member is movable between a first position and a second position forwardly of the first position. A first light source is disposed in the member and configured to emit excitation light rearwardly. A vehicle feature is operably coupled with the first light source. The light source illuminates the vehicle feature when the member is disposed in the second position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 7A is a side perspective view of the badge in the deployed position having one or more light sources therein, according to one embodiment;

FIG. 7B is a front perspective view of the badge in the deployed position, according to one embodiment;

DETAILED DESCRIPTION OF THE PREFERRED EMBODIMENTS

Figure 2:
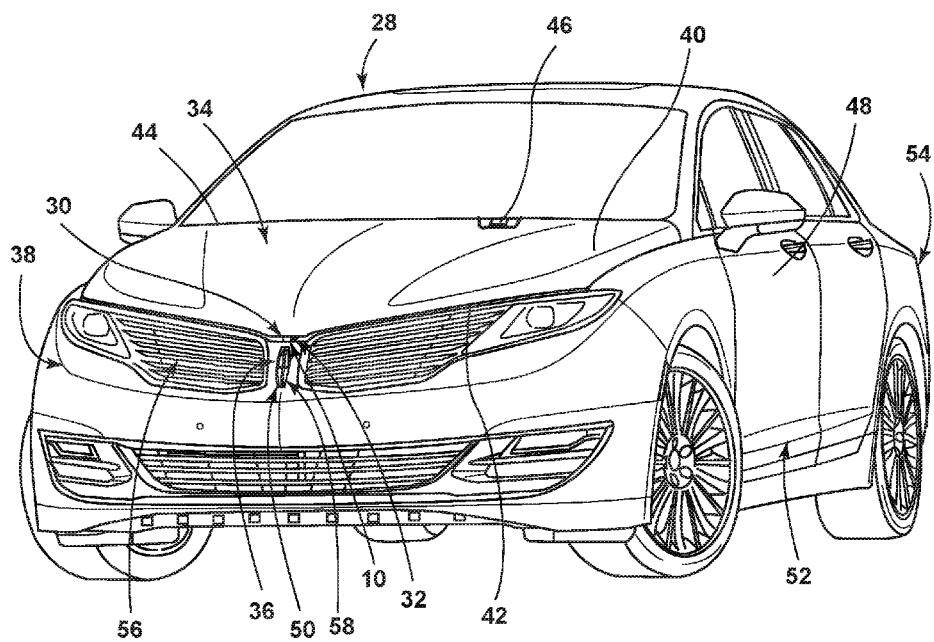
FIG. 2 is a front side perspective view of a motor vehicle incorporating an illuminated system, according to one embodiment.

For purposes of description herein, the terms "upper," "lower," "right," "left," "rear," "front," "vertical," "horizontal," "inward," "outward," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illuminated system for a vehicle. The illuminated system may advantageously employ one or more photoluminescent structures that illuminate in response to pre-defined events. The one or more photoluminescent structures may be configured to receive an excitation light and re-emit a converted light at a different wavelength typically found in the visible wavelength spectrum.

Figure 1A:
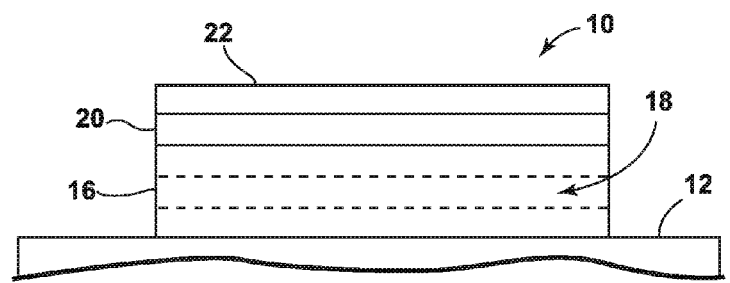
FIG. 1A is a side view of a photoluminescent structure rendered as a coating for use in a trim assembly according to one embodiment.
Figure 1B:
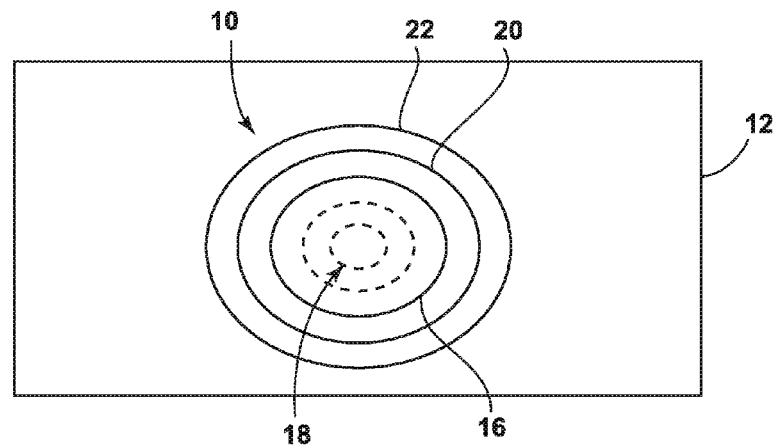
FIG. 1B is a top view of a photoluminescent structure rendered as a discrete particle according to one embodiment.
Figure 1C:
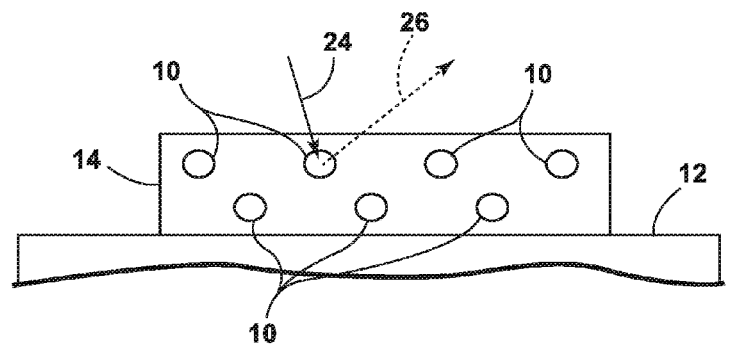
FIG. 1C is a side view of a plurality of photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by a light source 36 (FIG. 2) is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principle driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

According to one embodiment, the photoluminescent material 18 may include organic or inorganic fluorescent dyes including rylenes, xanthenes, porphyrins, and phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source 36 (FIG. 2). According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light source, such as the sun, and/or any artificial light source 36). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 mcd/m² after a period of 10 minutes. Additionally, the long persistence photoluminescent material 18 may be operable to emit light above or at an intensity of 0.32 mcd/m² after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light sources 36 that emits the excitation light 24, including, but not limited to, natural light sources (e.g., the sun) and/or any artificial light source 36. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m², or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in Toluene/Isopropanol, 125 parts of a green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Referring to FIG. 2, a vehicle 28 is shown demonstrating an illuminated system 30 configured to illuminate a portion of a latch assembly 32 and/or vehicle engine compartment 34. The illuminated system 30 may include a light source 36 disposed proximately to a front portion 38 of the vehicle 28 and the photoluminescent structure 10 disposed on a component of the latch system 30.

The vehicle 28 includes a hood 40 covering the engine compartment 34. The hood 40 is generally formed as a panel having a forward edge 42 and a rearward edge 44. The hood 40 may be connected to the body of the motor vehicle 28 by hinges 46. The hood 40 is releasably connected to the motor vehicle 28 through a hood latch assembly 32 and is pivotable relative to the motor vehicle 28 to move between an open position and a closed position. In the described example, the hood latch assembly 32 is located adjacent the forward edge 42 of the hood 40 and the hinges 46 may be located at the rearward edge 44 of hood 40. In exemplary embodiments, any closure of the vehicle 28, which may refer to at least one of a vehicle hood 40 configured to enclose the engine compartment 34, a deck lid, and/or a trunk lid configured to enclose a cargo compartment may include the illuminated system 30 provided herein. In alternate embodiments, the closure may correspond to a hatch or door 48 of a vehicle 28.

Still referring to FIG. 2, a badge 50 is generally shown mounted on the front portion 38 of the vehicle 28. In other embodiments, the badge 50, or any other trim component, may be located elsewhere, such as, but not limited to, other locations of the front portion 38, a side portion 52, or a rear portion 54 of the vehicle 28. Alternatively, the badge 50 may be disposed inside the vehicle 28. The badge 50 may be configured as an insignia that is presented as an identifying mark of a vehicle manufacturer, or any other desired information, and includes a front viewable portion 128 that is generally prominently displayed on the vehicle 28. In the presently illustrated embodiment, the badge 50 is centrally disposed on a front fascia 56 of the vehicle 28, thus allowing the badge 50 to be readily viewed by an observer looking head-on at the vehicle 28. The badge 50 may be articulable and conceal a hidden camera system 58 which may be disposed behind the badge 50, or any other cover disposed on the vehicle 28. As will be described below in greater detail, one or more light sources 36 (FIG. 7A) may be disposed within the badge 50 and may illuminate in a plurality of manners to provide a distinct styling element to the vehicle 28.

Referring to FIGS. 3-6, the badge 50, according to one embodiment, is coupled to the hidden camera system 58 that includes a housing 60 that holds a camera 62. The camera system 58 may further include a drive motor 64, associated gear transmission 66, a linkage 68 connecting the drive motor and gear transmission to the badge 50, and the camera 62. A gasket may be provided around the front opening 72 of the housing 60 to seal the front of the housing 60 when the badge 50 is in a retracted position.

As illustrated, the linkage 68 includes a crank arm 74, a first link 76, a second link 78, a badge support bracket 80 on which the badge 50 is mounted thereto or integrally formed therewith, and a camera mounting bracket 82. According to one embodiment, the crank arm 74 is connected to the gear transmission 66 by a rotating driveshaft 84. The opposite end of the crank arm 74 is pivotally connected to the first link 76 by a pivot pin 86. The second end of the first link 76 is connected to the second link 78 by a pivot pin 88. The first end of the second link 78 is connected to the badge support bracket 80 by a pivot pin 90. The second end of the second link 78 is connected to the camera mounting bracket 82 by a cam or roller 92 that is received and moves in a track 94 provided on the camera mounting bracket 82.

The second link 78 is pivotally mounted at a first point to the housing 60 by a pivot pin 96 received in a boss 98. The pivot pin 88 connecting the first and second links 76, 78 is provided at a second point on the link 78 between the first point and the second end. In the illustrated embodiment, the second link 78 is substantially C-shaped.

The camera mounting bracket 82 may engage a camera housing 100 and securely hold the camera 62 in position. The camera mounting bracket 82 is pivotally connected to the housing 60 by a first pivoting support arm 102. For instance, the support arm 102 is pivotally supported on the housing 60 by a boss 104. The badge support bracket 80 (and, therefore, the badge 50 supported thereon) is pivotally mounted to the housing 60 by a second pivoting support arm 106. Additionally, the second support arm 106 is pivotally mounted to the housing 60 on the boss 108.

Figure 3:
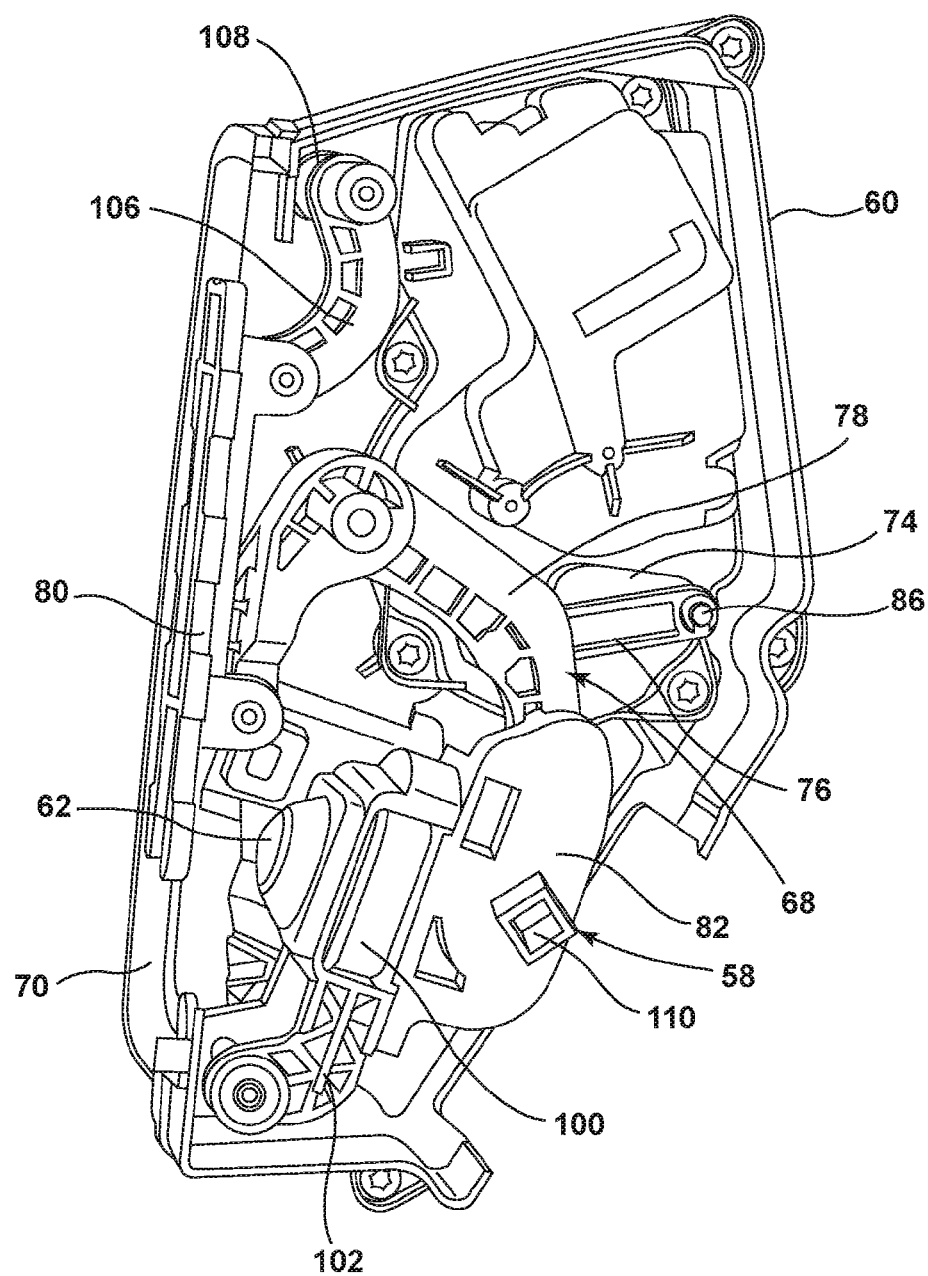
FIG. 3 is a first side fragmentary view of an articulable badge, according to one embodiment.
Figure 4:
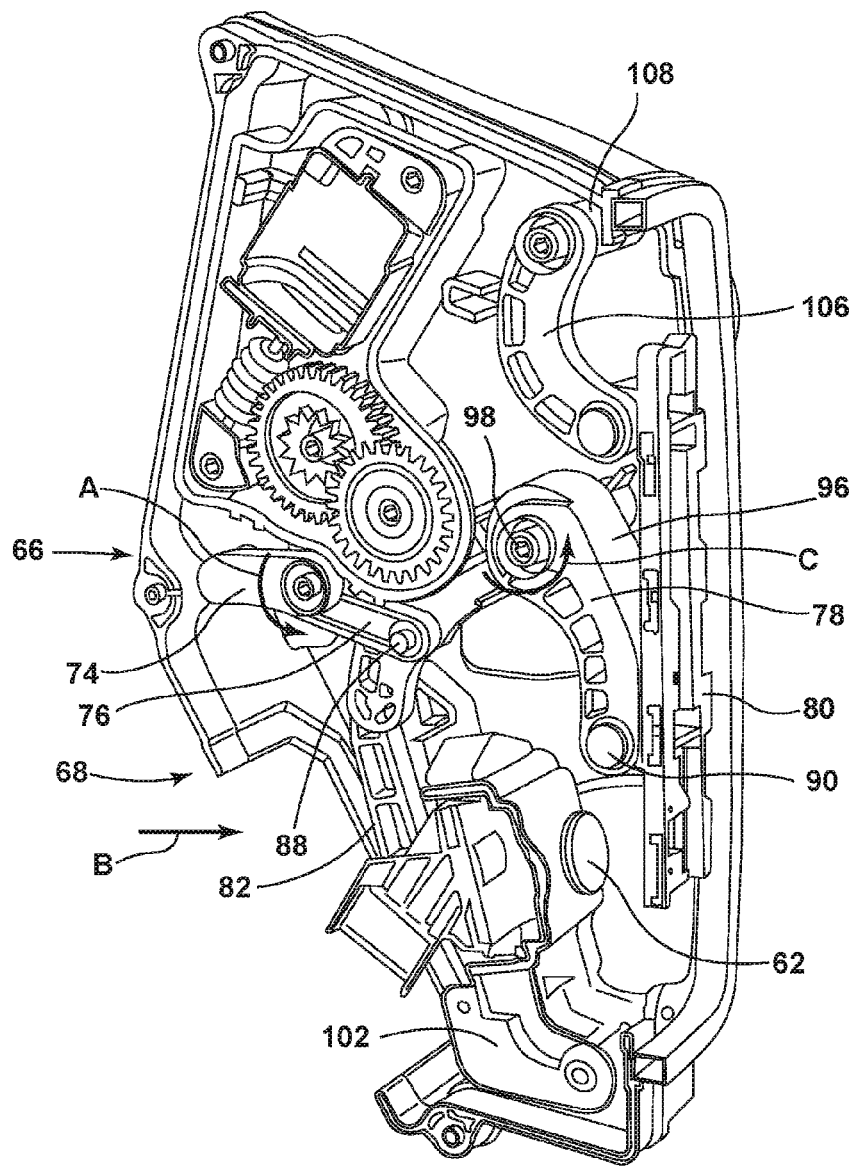
FIG. 4 is a second side fragmentary view of an articulable badge in a retracted position, according to one embodiment.
Figure 5:
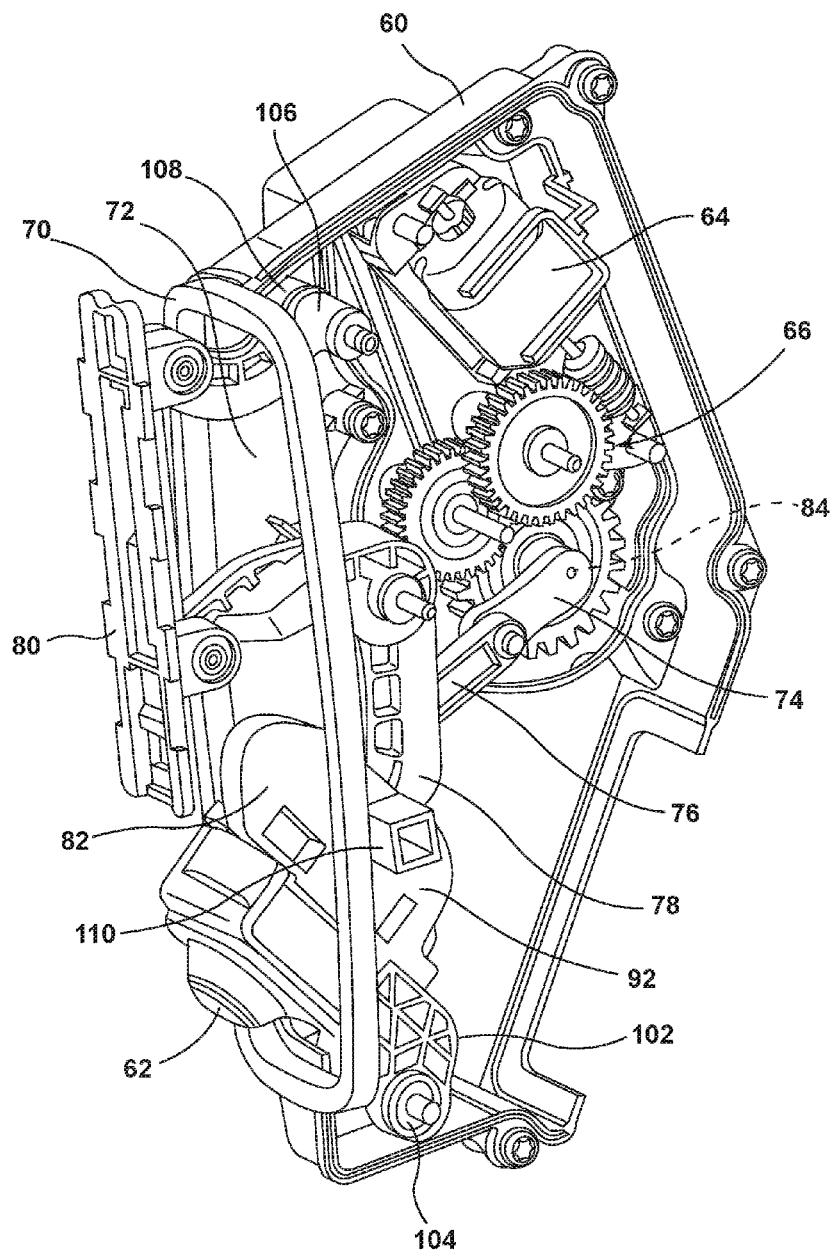
FIG. 5 is a first side fragmentary view of an articulable badge in the deployed position, according to one embodiment.
Figure 6:
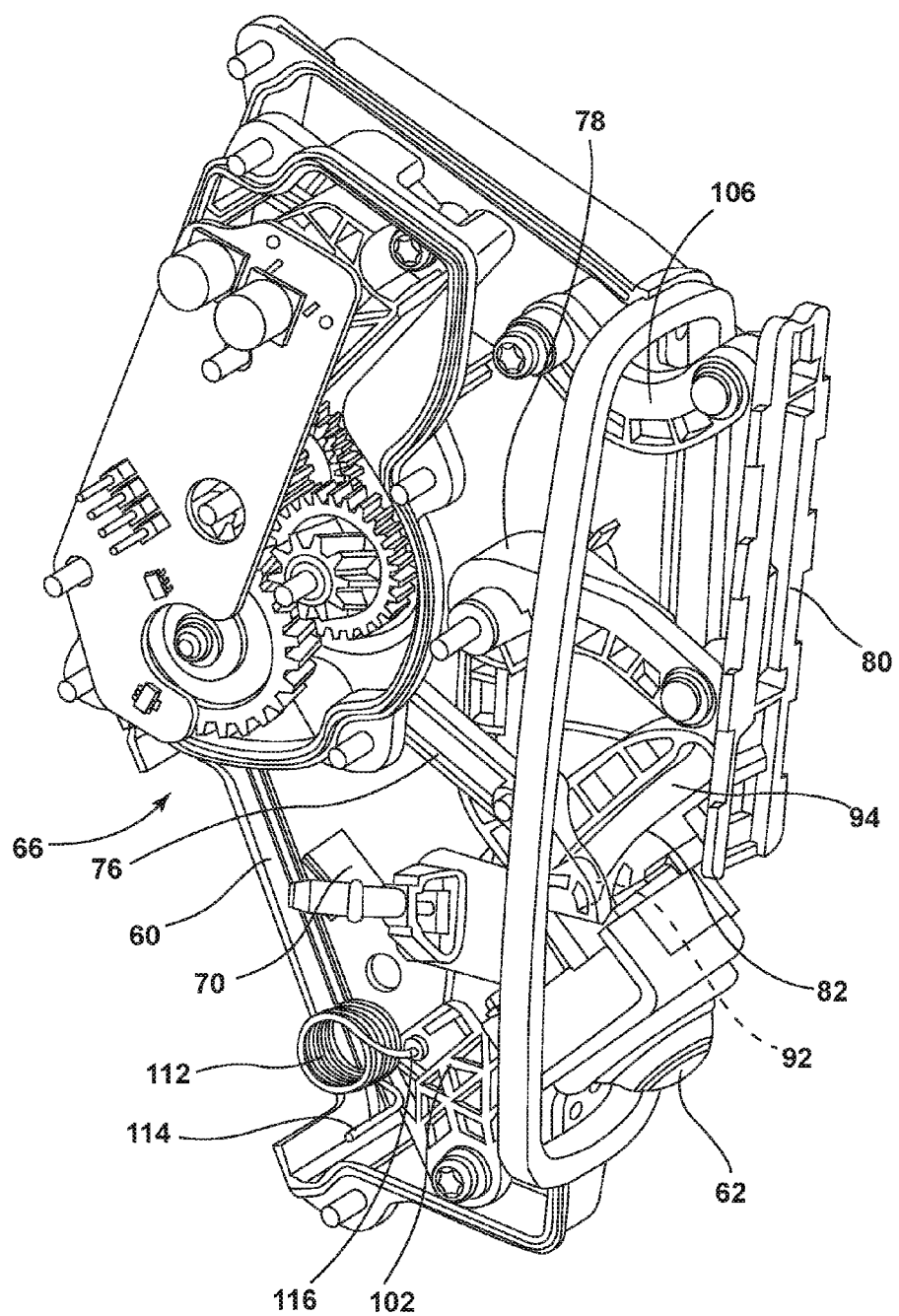
FIG. 6 is a second side fragmentary view of an articulable badge in the deployed position, according to one embodiment.

Referring to FIGS. 3 and 4, the hidden camera system 58 includes the camera 62 in the retracted position and the camera 62 hidden from view by the badge 50 (deleted from FIGS. 3 and 4 for clarity). When activated, the camera 62 is displaced to a deployed position, as illustrated in FIGS. 5 and 6. To move to such a position, the drive motor 64 operates through the gear transmission 66 and the driveshaft 84 to turn the crank arm 74 in the direction of action arrow A. This causes the first link 76 to translate in the direction of action arrow B so as to pivot the second link 78 about the boss 98 in the direction of action arrow C. This simultaneously causes the badge 50 to pivot open about the boss 108 and the camera 62 to pivotally deploy about the boss 104. An abutment 110, projecting from the side of the camera mounting bracket 82 engages a stop on the housing 60 when the camera 62 and badge 50 are both in the deployed position. A biasing element, in the form of a torsion spring 112, is received around the boss 104, to bias the camera 62 toward the deployed position, which may ensure that the camera 62 is repeatedly deployed into the substantially same position during each deployment. According to one embodiment, the torsion spring 112 has a first end 114 secured in a socket to the housing 60 and a second end 116 engaging the camera mounting bracket 82.

When it is desired to retract the camera 62, the drive motor 64 is driven in the opposite direction. This drives the crank arm 74 in the direction opposite to action arrow A which in turn causes the first link 76 to translate in a direction opposite to action arrow B. As a result, the second link 78 pivots in a direction opposite to action arrow C causing the camera 62 to be retracted while the badge is retracted. When the camera 62 and the badge 50 are retracted, the abutment 110 engages a second stop 70 formed on the housing 60. It will be appreciated that the articulation assembly described herein is a non-exclusive example of an assembly capable of moving the badge 50 between a retracted position and a deployed position. Any other mechanism known in the art may be used in conjunction with the articulation assembly described herein, or in place of the articulation assembly described herein, without departing from the scope of the present disclosure.

Referring to FIGS. 7A-7D, the badge 50, when in the deployed position is disposed forwardly of the front fascia 56 of the vehicle 28 and may also be disposed above the forward edge 42 of the hood 40. As will be described in greater detail below, the badge 50 includes one or more light sources 36 that may emit excitation light 24a and/or converted light 26a forwardly of the vehicle 28 and/or the badge 50. The one or more light sources 36 may also emit excitation light 24b and/or converted light 26b rearwardly of the badge 50. The forwardly emitted light 24a, 26a may provide a distinct aesthetic feature for the vehicle 28 and/or provide illumination for the camera disposed behind the badge 50. The rearwardly emitted light 24b, 26b may be used to illuminate a secondary hood release latch 118, the engine compartment 34 of the vehicle 28, and/or any other feature of the vehicle 28.

Figure 7C:
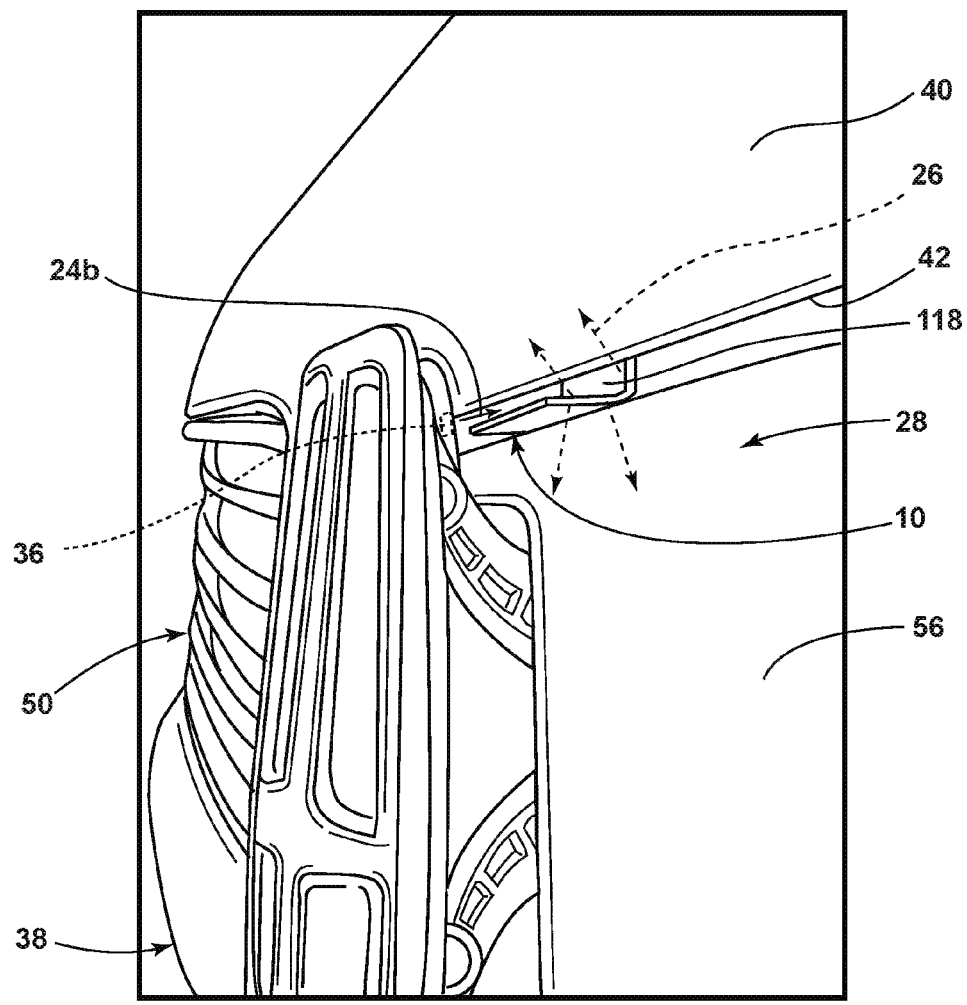
FIG. 7C is a side perspective view of the badge disposed on a front portion of the vehicle, according to one embodiment.
Figure 7D:
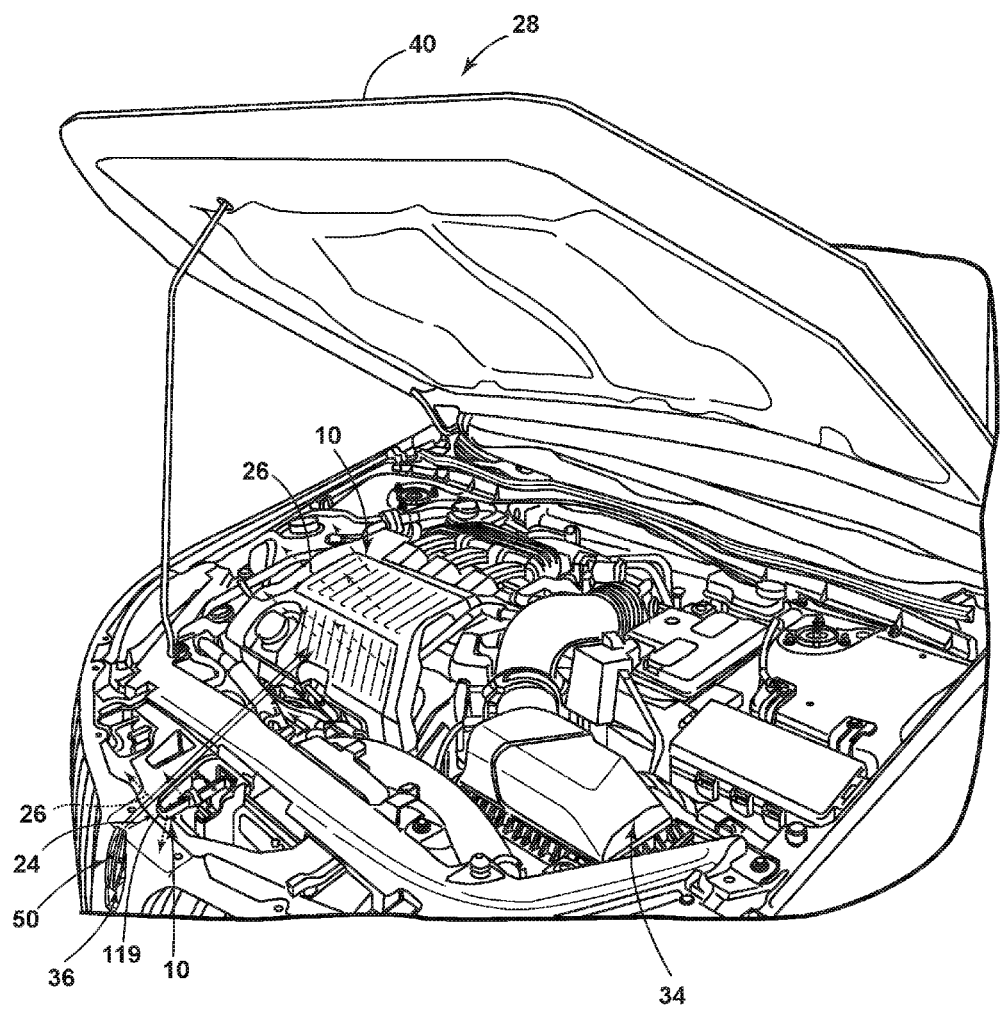
FIG. 7D is a partial front perspective view of the vehicle having an engine compartment that is illuminated by the badge, according to one embodiment.

As shown in FIGS. 7C and 7D, the badge 50 may emit excitation light 24 towards the secondary hood release latch 118, which may include the photoluminescent structure 10 thereon. In operation, according to one embodiment, when a primary hood release mechanism, disposed with the vehicle 28, releases the hood 40, the badge 50 may move to the deployed position and emit rearwardly directed excitation light 24b. The motor vehicle operator then moves to the front of the vehicle 28 in close proximity to the hood 40 to search for and locate the secondary hood release latch 118 by inserting his or her fingers under the partially opened hood 40.

To assist in locating the secondary hood release latch 118, the photoluminescent structure 10, disposed on the secondary hood release latch 118, is configured to luminesce in response to receiving excitation light 24 from the light source 36 is directed at the secondary hood release latch 118. Once located, the motor vehicle operator actuates the secondary hood release latch release handle 119 left or right, or up or down, depending on the design to open the hood 40. It will be appreciated that any component disposed adjacently to, or rearwardly of, the light source 36 may also luminesce in response to receiving excitation light 24 therefrom. For example, a vehicle feature disposed in the engine compartment 34 may have a photoluminescent structure 01 thereon and luminesce in response to the excitation light 24 once the hood 40 is placed in the open position.

Figure 8:
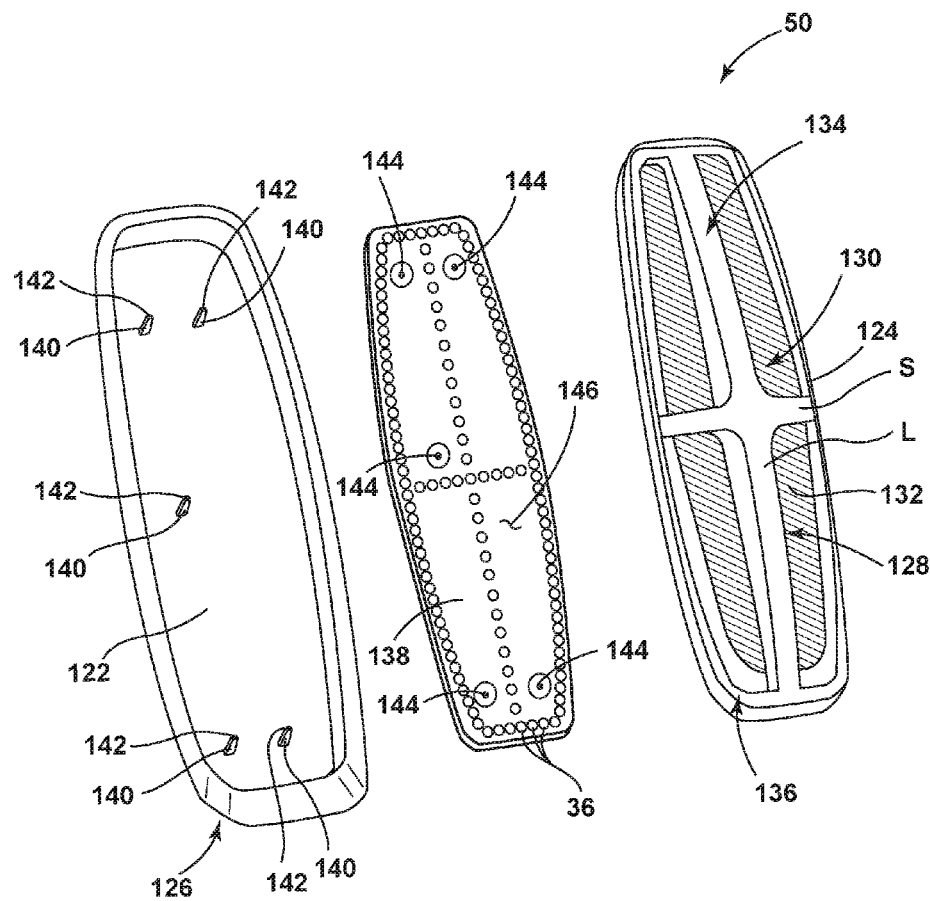
FIG. 8 is an exploded view of the badge, according to one embodiment.

Referring to FIG. 8, the badge 50 is shown, according to one embodiment, having a substrate 122, which may correspond to the badge support bracket 80, or be attached thereto. The substrate 122 may be attached to a housing 124. The substrate 122 may form a rear portion 126 of the badge 50 and may be capable of being secured to the badge support bracket 80 via any suitable means known in the art.

The housing 124 may include the front viewable portion 128 located on a forward portion 130 thereof. The front viewable portion 128 may include a background region 132 and indicia 134. The front viewable portion 128 may include a transparent and/or translucent portion and one or more substantially opaque portion(s), which may be configured as opaque coatings applied to the front viewable portion 128. In some embodiments, some, or all, of the front viewable portion 128 may be left open to the front portion 38 of the vehicle 28. According to one embodiment, the background region 132 may be opaque or light blocking whereas the portion associated with the indicia 134 is light transmissive. As shown, the indicia 134 includes a rim portion 136 and a cross-portion defined by a long arm L and a short arm S.

According to one embodiment, the substrate 122 and/or the housing 124 may be constructed from a rigid material such as, but not limited to, a polymeric material and may be assembled to one another via sonic welding, laser welding, vibration welding, injection molding, or any other process known in the art. Alternatively, the substrate 122 and/or the housing 124 may be assembled together via the utilization of adhesives and/or fasteners. Alternatively still, the substrate 122 and/or the housing 124 may be integrally formed as a single component.

Figure 9:
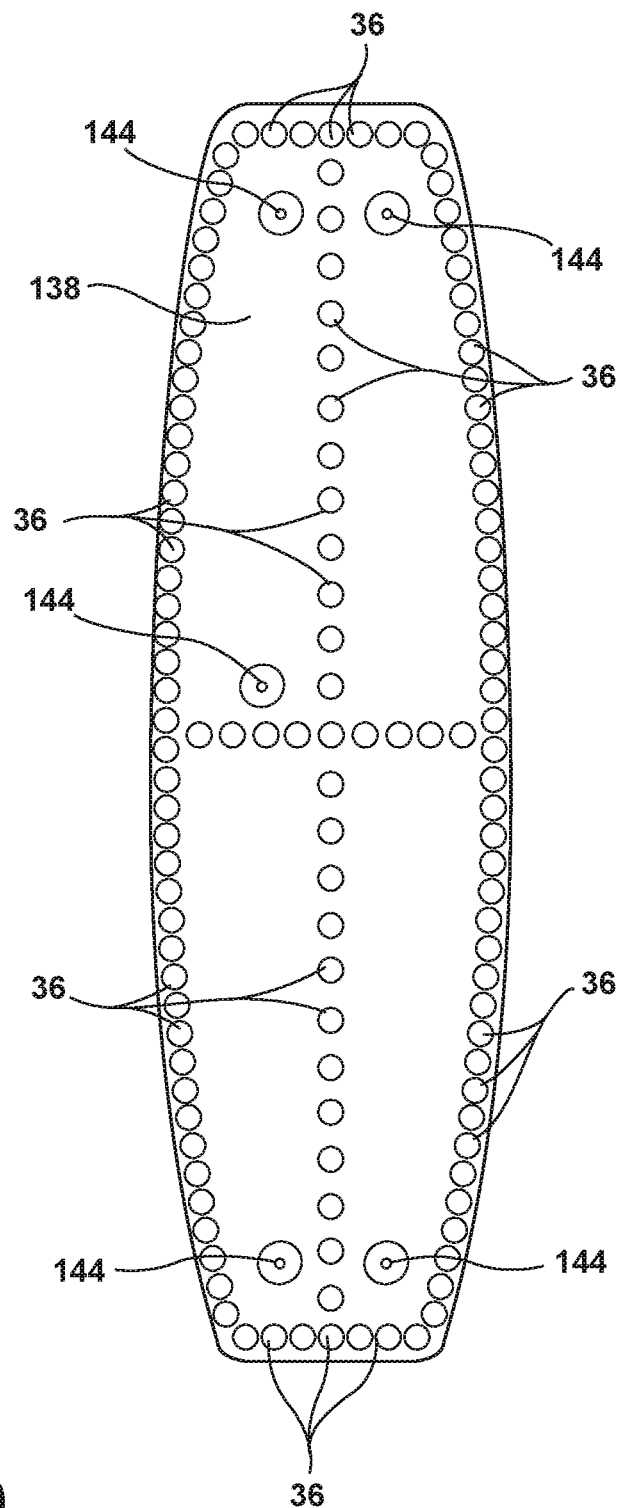
FIG. 9 is a front perspective view of a printed circuit board (PCB) disposed within the badge and having a plurality of light sources thereon, according to one embodiment.

With further reference to FIGS. 8 and 9, a printed circuit board (PCB) 138 may be secured between the substrate 122 and housing 124. According to one embodiment, the substrate 122 includes a plurality of raised platforms 140. A fastener hole 142 is defined in each platform 140 and a plurality of corresponding through holes 144 is defined by the PCB 138. Accordingly, a plurality of complimentary mechanical fasteners (not shown) may be inserted through the through holes 144 of the PCB 138 and mechanically engaged to the fastener holes 142 for removably fixing the PCB 138 to the substrate 122.

Figure 10:
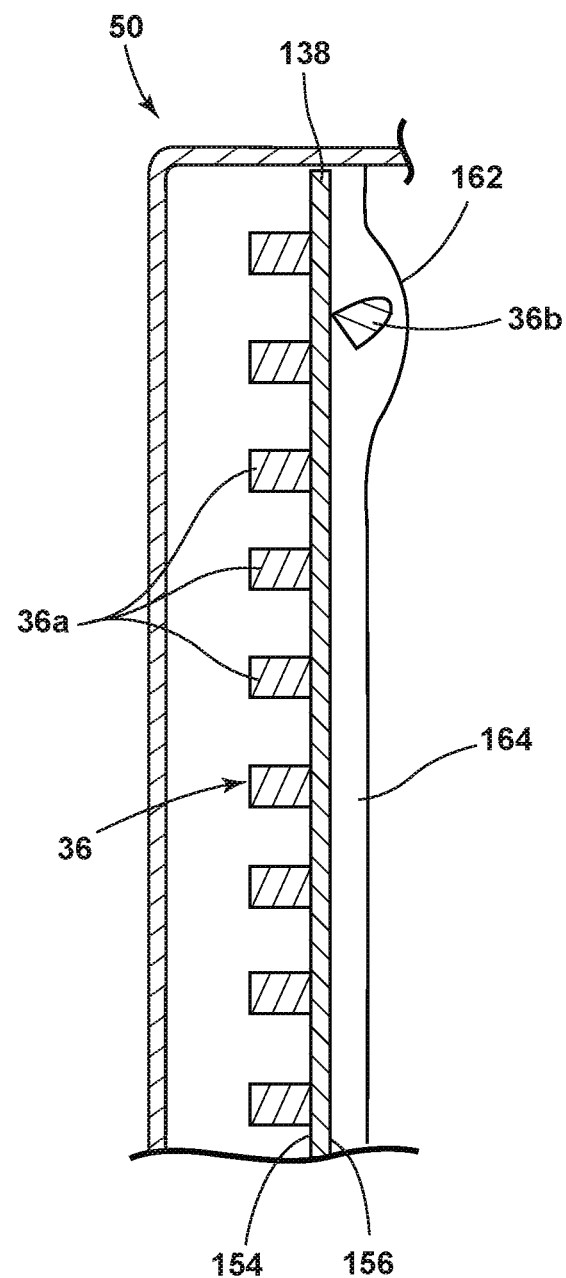
FIG. 10 is a cross-sectional view of the badge taken along the line X-X of FIG. 7A illustrating the badge having one or more light sources oriented on a first side of the PCB and one or more light sources oriented on a second side of the PCB, according to one embodiment.

Referring to FIGS. 9 and 10, the PCB 138 may have one or more of light sources 36 disposed thereon. The light sources 36 may include any form of light source. For example, fluorescent lighting, light emitting diodes (LEDs), organic LEDs (OLEDs), polymer LEDs (PLEDs), solid-state lighting, or any other form of lighting configured to emit light may be utilized. In some embodiments, a reflective (e.g., white) solder mask 146 may be applied to the PCB 138 to reflect light incident thereon. In operation, the light sources 36 may each be independently activated to emit light in a variety of colors at variable intensity. The light sources 36 may be activated concurrently or at different time intervals to exhibit different lighting effects.

Figure 11:
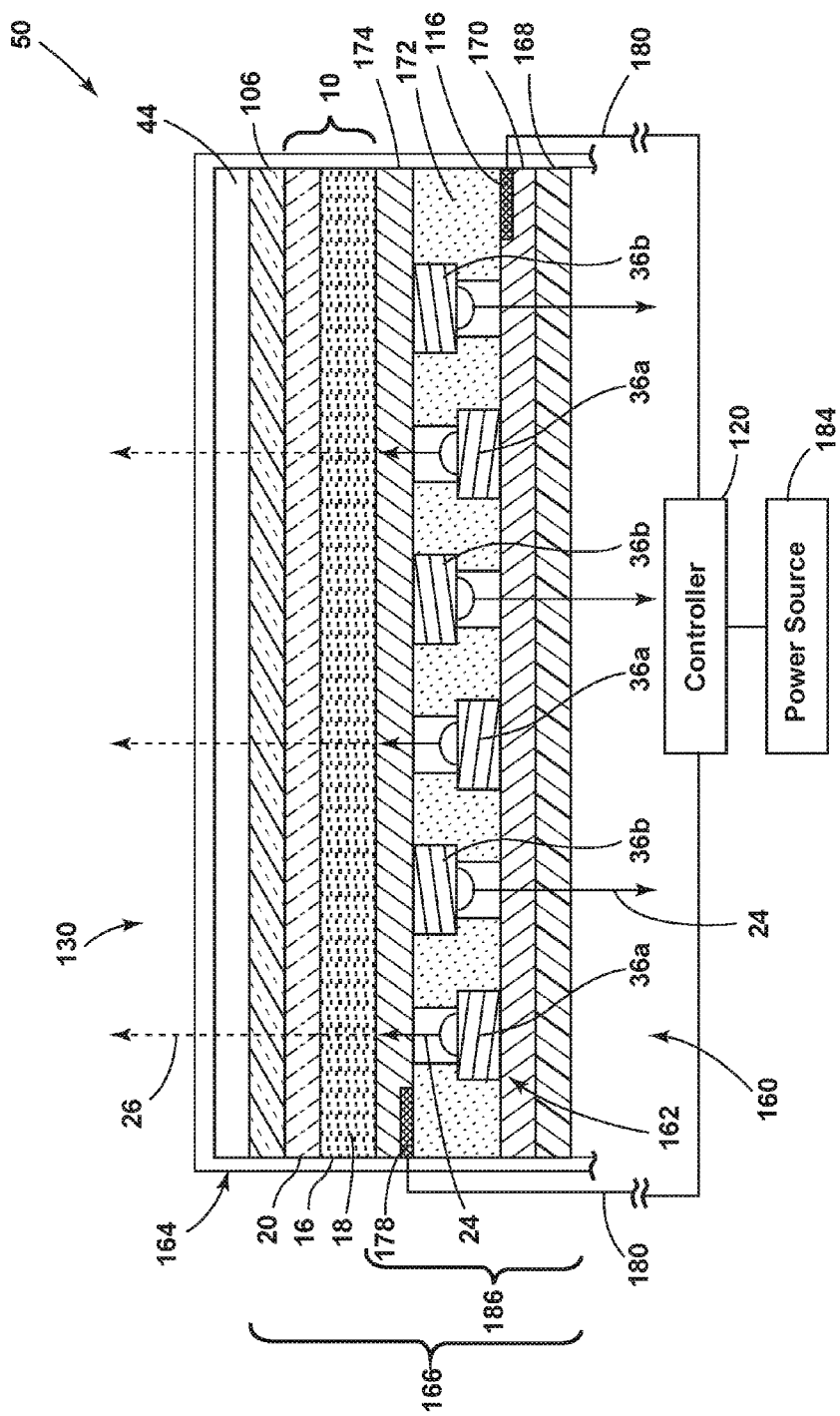
FIG. 11 is a cross-sectional view of an alternate embodiment of the badge taken along the line X-X of FIG. 7A.

Referring to FIG. 11, an exemplary cross section taken along the line X-X of FIG. 7A is illustrated. The badge 50, as described herein, may have one or more sets of one or more light sources 36. The light sources 36 may be disposed on two opposing sides 154, 156 of the PCB 138 and configured to direct excitation light 24 in two substantially opposing directions.

A decorative layer 158 may be disposed between the light sources 36 and the front viewable portion 128. The decorative layer 158 may additionally, or alternatively, be disposed between the light sources 36 and the rear viewable portion 160 to substantially conceal the components disposed between the substrate 122 and housing 44.

Referring still to FIG. 11, optics 162 may be operably coupled with the light sources 36 for further directing excitation light 24 and/or converted light 26 in a desired direction. The optics 162 may be an individual component, or integrally formed with an additional component of the badge 50. For example, the optics 162 may be integrally disposed on the badge 50 with an overmold material 164. The overmold material 164 may protect the light sources 36 from physical and chemical damage arising from environmental exposure.

Figure 12:
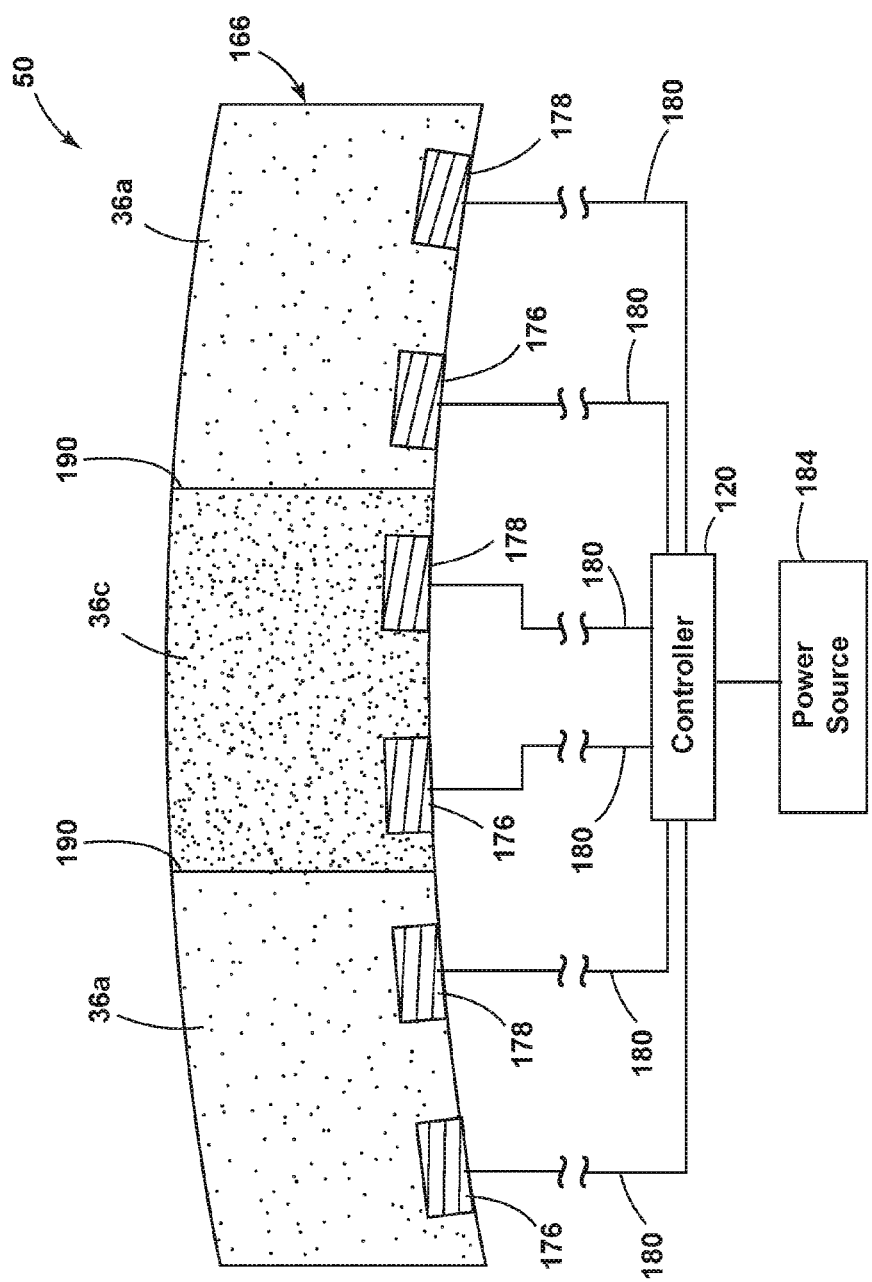
FIG. 12 is a top view of the light source illustrated in FIG. 11.

Referring to FIG. 12, a cross section taken along the line X-X of FIG. 7A illustrates a portion of the badge 50 according to an alternate embodiment in which the badge 50 includes first and second plurality of light sources 36a, 36b integrally formed into a light-producing assembly 166. While the light-producing assembly 166 is shown in a planar configuration, it should be appreciated that non-planar configurations are possible in instances where it is desired to place the light-producing assembly 166 in a curved orientation.

With respect to the illustrated embodiment, the light-producing assembly 166 includes a substrate 168, which may include a substantially transparent, or translucent, polycarbonate, poly-methyl methacrylate (PMMA), or polyethylene terephthalate (PET) material in the range of 0.005 to 0.060 inches thick. A positive electrode 170 is arranged over the substrate 168 and includes a substantially transparent conductive material such as, but not limited to, indium tin oxide. The positive electrode 170 is electrically connected to a printed light emitting diode (LED) arrangement that is arranged within a semiconductor ink 172 and applied over the positive electrode 170. Likewise, a substantially transparent negative electrode 174 is also electrically connected to the printed LED arrangement 186. The negative electrode 174 is arranged over the semiconductor ink 172 and includes a transparent or translucent conductive material such as, but not limited to, indium tin oxide. In alternative embodiments, the positive and negative electrodes 170, 174 may swap positions within the light-producing assembly 166 if desired. Each of the positive and negative electrodes 170, 174 are electrically connected to a controller 120 via a corresponding bus bar 176, 178 connected to one of the conductive leads 180. The bus bars 176, 178 may be printed along opposite edges of the positive and negative electrodes 170, 174 and the points of connection between the bus bars 176, 178 and the conductive leads 180 may be at opposite corners of each bus bar 176, 178 to promote uniform current distribution along the bus bars 176, 178. The controller 120 may also be electrically connected to a power source 184, which may correspond to a vehicular power source operating at 12 to 16 VDC.

The printed LED arrangement 186 may be dispersed in a random or controlled fashion within the semiconductor ink 172. In the presently illustrated embodiment, the printed LED arrangement 186 includes a first plurality of LED sources 36a biased to direct light towards the front viewable portion 128 and a second plurality of LED sources 36b biased to direct light towards the rear viewable portion 160. The light sources 36a, 36b may correspond to micro-LEDs of gallium nitride elements in the range of 5 to 400 microns in size and the semiconductor ink 172 may include various binders and dielectric material including, but not limited to, one or more of gallium, indium, silicon carbide, phosphorous, and/or translucent polymeric binders.

Given the small sizing of the printed light sources 36a, 36b, a relatively high density may be used to create substantially uniform illumination. The semiconductor ink 172 can be applied through various printing processes, including ink jet and silkscreen processes to selected portion(s) of the positive electrode 170. More specifically, it is envisioned that the light sources 36a, 36b are dispersed within the semiconductor ink 172, and shaped and sized such that they align with the positive and negative electrodes 170, 174 during deposition of the semiconductor ink 172. The portion of the light sources 36a, 36b that ultimately are electrically connected to the positive and negative electrodes 170, 174 may be selectively activated and deactivated by the controller 120. The LED sources (e.g., 36a) may be disposed in one or more sets, as described herein.

Referring still to FIG. 12, the light-producing assembly 166 may further include the photoluminescent structure 10 arranged over the negative electrode 174 as a coating, layer, film or other suitable deposition. As described above, the photoluminescent structure 10 may be arranged as a multilayered structure including an energy conversion layer 16, an optional stability layer 20, and/or an optional protective layer 22.

In some embodiments, the decorative layer 158 may be disposed between the front viewable portion 128 and the light-producing assembly 166. The decorative layer 158 may include a polymeric material, film, and/or other suitable material that is configured to control or modify an appearance of the front viewable portion 128. For example, the decorative layer 158 may be configured to confer a metallic appearance when the light-producing assembly 166 is in an unilluminated state. In other embodiments, the decorative layer 158 may be tinted any color.

Figure 13:
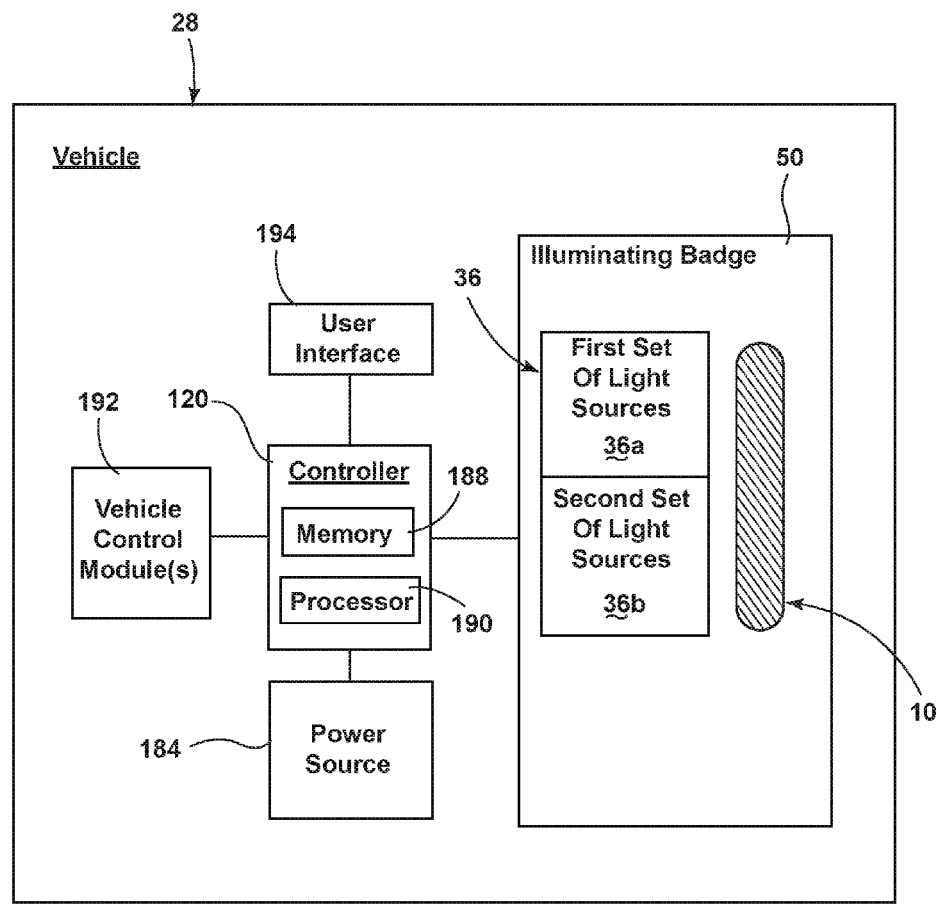
FIG. 13 is a block diagram of the illuminated system.

Referring to FIG. 13, the light-producing assembly 166, according to one embodiment, is illustrated from a top view having varying types and concentrations of LED sources 36a, 36c, transversely along the light-producing assembly 166. As illustrated, the first and second sets of one or more light sources 36 may be separated by insulative, or non-conductive, barriers 190 from proximately disposed sets of one or more light sources 36 through any means known in the art such that each set of one or more light sources 36 may be illuminated independently of any other set of one or more light sources 36. Further, each set of one or more light sources 36 disposed within the light-producing assembly 166 may include a respective bus bar 176, 178 coupled to the controller 120 and configured to electronically energize and then illuminate each respective set of one or more light sources 36.

The light sources 36a, 36b may all be orientated in the same direction and/or in opposing directions, as described herein. It should be appreciated that the light-producing assembly 166 may include any number of sets of one or more light sources 36 having varying LED sources 36a, 36b, therein that may illuminate in any desired color. Moreover, it should be appreciated that the portions having varied LED sources 36a, 36b may be orientated in any practicable manner and need not be disposed adjacently.

With further reference to FIG. 13, the semiconductor ink 172 may also contain various concentrations of LED sources 36a, 36b, such that the density of the LED sources 36a, 36b, or number of LED sources 36a, 36b, per unit area, may be adjusted for various lighting applications. In some embodiments, the density of LED sources 36a, 36b, may vary across the length of the light-producing assembly 166. For example, the first set of light sources 36 may have a greater density of LED sources 36a than alternate sets of light sources 36, or vice versa.

Referring to FIG. 14, a box diagram of a vehicle 28 is shown in which an illuminated badge 50 is implemented. The badge 50 includes a controller 120 in communication with the one or more light sources 36. The controller 120 may include memory 188 having instructions contained therein that are executed by a processor 190 of the controller 120. The controller 120 may provide electrical power to the light sources 36 via a power source 184 located onboard the vehicle 28. In addition, the controller 120 may be configured to control the light output of the one or more light sources 36 based on feedback received from one or more vehicle control modules 192 such as, but not limited to, a body control module, engine control module, steering control module, brake control module, the like, or a combination thereof. By controlling the light output of the one or more light sources 36, the badge 50 may illuminate in a variety of colors and/or patterns to provide excitation light 24 thereby causing a vehicle feature to luminesce.

In operation, the badge 50 may exhibit a constant unicolor or multicolor illumination. For example, the controller 120 may prompt one of the first and second sets of one or more light sources 36 within the badge 50 to flash a multitude of colors at a pre-defined interval. Simultaneously, the remaining sets of one or more light sources 36 may illuminate in a steady unicolor, may flash through a multitude of colors, may excite the first, second, and/or third photoluminescent structure 10, and/or be placed in an off state by the controller 120. Also, the controller 120 may vary power to each light source 36 from 1 to 5 times steady state current to vary the color and brightness of each illumination. The controller 120 may also illuminate multiple colors within a single light source 36 concurrently, thereby producing additional color configurations if the single light source 36 is configured as a Red, Green, Blue (RGB) LED.

In another embodiment, the photoluminescent structure 10 may exhibit periodic unicolor or multicolor illumination. For example, the controller 120 may prompt the first set of light sources 36a to periodically emit excitation light 24 to cause the photoluminescent structure 10 to periodically illuminate in the first color. Alternatively, the controller 120 may prompt the second set of light sources 36b to periodically emit excitation light 24 to cause the photoluminescent structure 10 to periodically illuminate.

In another embodiment, the badge 50 may include a user interface 194. The user interface 194 may be configured such that a user may control the wavelength of excitation light 24 that is emitted by the light source 36 or the pattern of illumination of displayed on the front viewable portion 128 and/or the rear viewable portion 160.

In some embodiments, the controller 120 may be configured to adjust a color of the converted light 26 by sending control signals to adjust an intensity or energy output level of the light source 36. For example, if the one or more light sources 36 are configured to emit the excitation light 24 at a low level, substantially all of the excitation light 24 may be converted to the converted light 26 by the first, second, and/or third photoluminescent structure 10. In this configuration, a color of light corresponding to the converted light 26 may correspond to the color of the converted light 26 from the badge 50 and/or the vehicle feature. If the first and second sets of one or more light sources 36 are configured to emit the excitation light 24 at a high level, only a portion of the excitation light 24 may be converted to the converted light 26 by the first, second, and/or third photoluminescent structure 10. In this configuration, a color of light corresponding to mixture of the excitation light 24 and the converted light 26 may be output as the converted light 26. In this way, the controller 120 may control an output color of the converted light 26.

Though a low level and a high level of intensity are discussed in reference to the excitation light 24, it shall be understood that the intensity of the excitation light 24 may be varied among a variety of intensity levels to adjust a hue of the color corresponding to the converted light 26 from the badge 50. The variance in intensity may be manually altered, or automatically varied by the controller 120 based on pre-defined conditions. According to one embodiment, a first intensity may be output from the badge 50 when a light sensor senses daylight conditions. A second intensity may be output from the badge 50 when the light sensor determines the vehicle 28 is operating in a low light environment.

As described herein, the color of the converted light 26 may be significantly dependent on the particular photoluminescent materials 18 utilized in the photoluminescent structure 10. Additionally, a conversion capacity of the photoluminescent structure 10 may be significantly dependent on a concentration of the photoluminescent material 18 utilized in the photoluminescent structure 10. By adjusting the range of intensities that may be output from the light sources 36, the concentration, types, and proportions of the photoluminescent materials 18 in the photoluminescent structure 10 discussed herein may be operable to generate a range of color hues of the converted light 26 by blending the excitation light 24 with the converted light 26. Moreover, the photoluminescent structure 10 may include a wide range of photoluminescent materials 18 that are configured to emit the converted light 26 for varying lengths of time.

Accordingly, an illuminated system for a vehicle has been advantageously described herein. The illuminated system provides various benefits including an efficient and cost-effective means to produce illumination that may function as a distinct styling element that increases the refinement of a vehicle, or any other product that may have the illuminated system disposed thereon.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An illuminated system for a vehicle, comprising:
a badge movable between a first position and a second position;
first and second light sources disposed within the badge, the first light source configured to direct light in a first direction and the second light source configured to direct light in a second direction;
a vehicle feature separately disposed from the badge and operably coupled with the second light source;
a first photoluminescent structure disposed on the vehicle feature and configured to luminesce in response to receiving an excitation light from the light source; and
a controller configured to selectively activate the first and second light sources.

2. The illuminated system for a vehicle of claim 1, wherein the first photoluminescent structure includes at least one photoluminescent material configured to convert an excitation light into a visible light.

3. The illuminated system for a vehicle of claim 1, wherein the first photoluminescent structure includes a long persistent photoluminescent material therein.

4. The illuminated system for a vehicle of claim 1, wherein the first light source emits light that is directed forwardly of a vehicle and the second light source directs light rearwardly of the badge.

5. The illuminated system for a vehicle of claim 1, further comprising:
a second photoluminescent structure operably coupled with the first light source.

6. The illuminated system for a vehicle of claim 5, wherein the first and second light sources emit a wavelength of light that is within one of blue light, violet light, and UV light spectrums.

7. The illuminated system for a vehicle of claim 1, further comprising:
optics operably coupled with the second light source and configured to direct light towards the vehicle feature.

8. A vehicle illuminated system, comprising:
a badge disposed on a front of a vehicle, the badge movable between a first position and a second position; and
a light source disposed in the badge, wherein the light source is concealed in the first position and configured to emit excitation light rearwardly in the second position towards a vehicle feature separately disposed from the badge.

9. The illuminated system of claim 8, further comprising:
a first photoluminescent structure disposed on the vehicle feature and configured to luminesce in response to receiving the excitation light.

10. The illuminated system of claim 9, further comprising:
a second photoluminescent structure operably coupled with the light source.

11. The illuminated system of claim 10, wherein the first photoluminescent structure and the second photoluminescent structure each include at least one photoluminescent material configured to convert an excitation light into a visible converted light that is outputted to a viewable portion.

12. The illuminated system of claim 8, wherein the vehicle feature is a secondary hood release latch and the badge moves from the first position to the second position to illuminate the secondary hood release latch to assist in opening a vehicle hood.

13. The illuminated system of claim 8, wherein the vehicle feature is a vehicle component within an engine compartment of the vehicle.

14. The illuminated system of claim 9, wherein the badge includes a light transmissive housing and substrate such that light emitted from the light source may be emitted therethrough.

15. An illuminated system for a vehicle, comprising:
a movable badge disposed on a vehicle, the badge movable between a first position and a second position forwardly of the first position;
a first light source disposed in the badge; and
a vehicle feature separately disposed from the badge and operably coupled with the first light source, wherein the light source illuminates the vehicle feature when the badge is disposed in the second position.

16. The illuminated system of claim 15, further comprising:
a photoluminescent structure disposed on the vehicle feature and configured to luminesce in response to receiving an excitation light from the first light source.

17. The illuminated system of claim 15, wherein the first light source is disposed on a first side of a printed circuit board (PCB) and a second light source disposed on a second side of the PCB.

18. The illuminated system of claim 15, wherein the vehicle feature is a secondary hood release latch.

19. The illuminated system of claim 18, wherein the badge is moved from the first position to the second position when a primary hood release latch is deployed thereby causing the first light source to illuminate the secondary hood release latch.

20. The illuminated system of claim 15, wherein a camera system is concealed by the movable badge when the movable badge is in the first position.

* * * * *